A. BREIDER.
SLATE CLEANER.
APPLICATION FILED NOV. 28, 1910.

1,015,539.

Patented Jan. 23, 1912.

Witnesses
M. Schmid
C. Heymann

Inventor:
Armin Breider
by B. Singer
atty.

UNITED STATES PATENT OFFICE.

ARMIN BREIDER, OF NAGYVARAD, AUSTRIA-HUNGARY.

SLATE-CLEANER.

1,015,539.   Specification of Letters Patent.   Patented Jan. 23, 1912.

Application filed November 28, 1910. Serial No. 594,564.

*To all whom it may concern:*

Be it known that I, ARMIN BREIDER, merchant, a subject of the Emperor of Austria-Hungary, residing at Nagyvarad, Austria-Hungary, have invented new and useful Improvements in Slate-Cleaners, of which the following is a specification.

My invention relates to certain improvements in slate-cleaners.

It has for its object the provision of a slate cleaner, which will eliminate certain inconveniences heretofore present in similar appliances known at this time.

Cleaners for slates and the like are already known, which consist in a casing, containing a filling of an absorbing material, which partially projects on the one end of the casing. When using this known kind of cleaners for the cleaning of slates and the like however the inconvenience appears, that the quantity of water, separated from the wetted absorbing material, varies according as the filling has just been impregnated with water or if after this impregnation the cleaner has already been in use for a certain time. Now in order to prevent this inconvenience, according to the present invention the filling of the case is composed of two different layers of materials of different absorbing effect, of which the inner layer, being made preferably from asbestos is of greater capacity in absorbing water or capable of holding a larger quantity of water, sufficient in use for a longer space of time and thus serving as a species of store-case for the water, while a second layer adjoining to the inner one, partially projecting out of the casing and preferably consisting of felt, is of less capacity in absorbing water, so that this second layer will always complete its content of water, according to the consumption, by absorbing from that contained in the inner layer, thus always preserving its moisture at a certain uniform degree. By these means it is effected, that the layer, coming into contact with the surface to be cleaned, either directly or with interposed permeable material, will under all circumstances present a uniform content of water, as long as the store of water, accumulated in the inner layer of the filling will suffice. Moreover by exerting a pressure on the cleaner, stronger than the cleaning procedure makes necessary, it is also possible to obtain temporarily in case of need a greater moisture content of the outer layer, since the water pushed out of the inner layer by the high pressure enters into the outer layer of felt, which opposes a greater resistance against compression, than the inner layer of asbestos.

Figure 1:
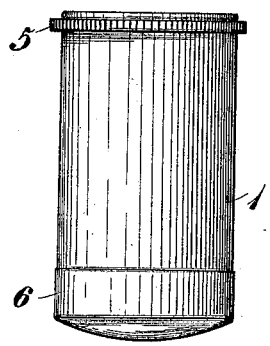
Figure 2:
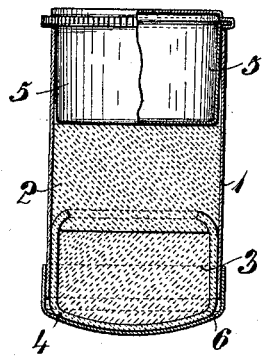
Figure 3:
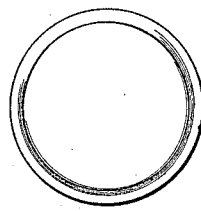

In the drawings, forming part of this specification, Figure 1 is a side view of a slate cleaner, constructed in accordance with my invention, Fig. 2 is a sectional view and Fig. 3 is a top plan view of the same.

Referring to the drawings, 1 indicates a metal casing, preferably of cylindrical form, which casing contains a filling, consisting of two different layers, one layer 2 of asbestos, being disposed in the middle part of the casing and a second layer 3 of coarse spongy felt, being disposed adjoining the inner layer 2 and partially projecting out of the casing. The absorbing effect of the inner layer 2 is much more efficient than that of the outer layer 3. The latter is covered with a cap 4 of pressed felt, buckskin or the like. The upper end of the casing 1, is closed by a hollow detachable cover 5, having its lower end in the form of the frustum of a cone, which part, when the cover is in place, contacts with the inner side of the casing 1, insuring a tight joint. On the opposite end of the casing a hood 6, is placed when the cleaner is not in use, thus protecting the moist projection and preventing it from coming in contact with articles.

When it is desired to put the cleaner in condition for use the cover 5 is detached and the casing filled with water, as much as the two layers 2 and 3 are capable of absorbing. Any excess of water must be poured out. After setting up the cover 5 again, the cleaner is ready for use for a rather long space of time. Of course the hood 6 must be taken off before every use. The slight pressure exerted on the felt cap 4 when in use causes a slight compressing of the two layers 2 and 3, whereby a sufficient quantity of water leaves the cleaner for washing a slate of any kind. The inner layer 2, which contains most of the water is more compressible than the outer layer 3, and therefore a part of the water of the layer 2 will leave the same and be absorbed by the outer layer 3 which is less compressible. Thus the water content of this outer layer will always be supplied from that of the layer 2. As besides, the two layers, when the cleaner is not in use, are always protected, against drying up, the present slate cleaner will be available with one filling of water for an extremely long space of time.

This slate-cleaner can preferably be used for the slates used in connection with card or billiard-playing. It will also be of great help for wetting stamps and envelops or the like.

Having now fully described my invention, what I claim as new and desire to secure by Letters Patent is—

A slate cleaner comprising in combination, a rigid casing having a closed and an open end, a filling of absorbent material for said casing projecting from the open end thereof, the upper portion of said filling having the greater absorbing capacity, and a cup-shaped cap of permeable material inclosing the said projecting portion of said filling and having its upper margin clenched to engage the said filling.

In testimony whereof I affix my signature in presence of two witnesses.

ARMIN BREIDER.

Witnesses:
ALFRED BERAN,
ADA MARIA BERGER.

Copies of this patent may be obtained for five cents each, by addressing the "Commissioner of Patents, Washington, D. C."